US009626085B2

(12) United States Patent
Gwak

(10) Patent No.: US 9,626,085 B2
(45) Date of Patent: Apr. 18, 2017

(54) METHOD AND APPARATUS FOR DESIGNATING ENTIRE AREA USING PARTIAL AREA TOUCH IN A PORTABLE EQUIPMENT

(71) Applicant: Samsung Electronics Co., Ltd, Gyeonggi-do (KR)

(72) Inventor: Ho-Gil Gwak, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 572 days.

(21) Appl. No.: 13/673,768

(22) Filed: Nov. 9, 2012

(65) Prior Publication Data

US 2013/0120292 A1    May 16, 2013

(30) Foreign Application Priority Data

Nov. 11, 2011   (KR) .......................... 10-2011-0117836

(51) Int. Cl.
*G06F 3/041* (2006.01)
*G06F 3/0488* (2013.01)
(Continued)

(52) U.S. Cl.
CPC ........ *G06F 3/04845* (2013.01); *G06F 3/0416* (2013.01); *G06F 3/04883* (2013.01);
(Continued)

(58) Field of Classification Search
CPC .. G06F 1/1643; G06F 3/03547; G06F 3/0412; G06F 3/0416; G06F 3/0488; G06F 3/048; G06F 3/04886; G06F 3/04895; G06F 3/04897; G06F 2203/04803; G06F 3/04883; G06F 3/04845
(Continued)

(56) References Cited

U.S. PATENT DOCUMENTS 5,553,296 A    9/1996   Forrest et al.
8,046,685 B2   10/2011  Kishi
(Continued)

FOREIGN PATENT DOCUMENTS

CN    101256463 A      9/2008
CN    10-1281450 A  *  10/2008
(Continued)

OTHER PUBLICATIONS

Notification of Reconsideration Report dated Oct. 31, 2014 in connection with Japanese Patent Application No. 2012-248780; 4 pages.
(Continued)

*Primary Examiner* — Julie Anne Watko

(57) ABSTRACT

A portable device is configured to perform a touch input method. The method includes determining whether an input for selecting a specific divided area is detected in a divided touch area on a screen divided into a plurality of areas. The method also includes, if the input for selecting the specific divided area is detected, moving the selected specific divided area to the divided touch area. The method further includes, if a specific input occurs in the selected specific divided area moved to the divided touch area, performing a function of an item indicated by the specific input.

20 Claims, 7 Drawing Sheets

(51) Int. Cl.
*G06F 3/0484* (2013.01)
*G06F 3/0354* (2013.01)
*G06F 3/0489* (2013.01)

(52) U.S. Cl.
CPC ...... *G06F 3/04886* (2013.01); *G06F 3/03547* (2013.01); *G06F 3/0412* (2013.01); *G06F 3/04895* (2013.01); *G06F 2203/04803* (2013.01)

(58) Field of Classification Search
USPC ........................................................ 345/173
See application file for complete search history.

(56) References Cited

U.S. PATENT DOCUMENTS

| | | | |
|---|---|---|---|
| 8,493,338 B2* | 7/2013 | Nakajoh ...................... | 345/173 |
| 9,013,423 B2* | 4/2015 | Ferren ................ | G02B 13/0065 |
| | | | 345/173 |
| 9,035,888 B1 | 5/2015 | DeLatorre | |
| 9,189,124 B2 | 11/2015 | Pahlavan et al. | |
| 2007/0094620 A1* | 4/2007 | Park ....................... | G06F 3/0481 |
| | | | 715/862 |
| 2007/0273663 A1 | 11/2007 | Park et al. | |
| 2008/0094421 A1 | 4/2008 | Maeda | |
| 2008/0320391 A1* | 12/2008 | Lemay ................. | G06F 3/04886 |
| | | | 715/702 |
| 2009/0055771 A1 | 2/2009 | Nurmi | |
| 2009/0070670 A1 | 3/2009 | Kishi | |
| 2009/0091547 A1 | 4/2009 | Kikuoka | |
| 2010/0248788 A1 | 9/2010 | Yook et al. | |
| 2010/0306650 A1* | 12/2010 | Oh ......................... | G06F 3/0482 |
| | | | 715/702 |
| 2010/0321323 A1 | 12/2010 | Kim | |
| 2011/0007009 A1* | 1/2011 | Ishihara et al. ............... | 345/173 |
| 2011/0148779 A1 | 6/2011 | Abe et al. | |
| 2011/0169749 A1 | 7/2011 | Ganey et al. | |
| 2011/0181517 A1 | 7/2011 | Orr et al. | |
| 2011/0198253 A1 | 8/2011 | Sato et al. | |
| 2011/0285658 A1 | 11/2011 | Homma et al. | |
| 2012/0075194 A1* | 3/2012 | Ferren ................ | G02B 13/0065 |
| | | | 345/168 |
| 2012/0113007 A1 | 5/2012 | Koch et al. | |
| 2013/0332881 A1 | 12/2013 | Yook et al. | |
| 2014/0007006 A1 | 1/2014 | Pallakoff | |
| 2014/0181721 A1 | 6/2014 | Buck | |
| 2014/0351768 A1* | 11/2014 | Park ...................... | G06F 3/0488 |
| | | | 715/856 |

FOREIGN PATENT DOCUMENTS

| | | | | |
|---|---|---|---|---|
| CN | 101281450 A | | 10/2008 | |
| CN | 10-1388041 A | * | 3/2009 | |
| CN | 101382868 A | | 3/2009 | |
| CN | 101388041 A | | 3/2009 | |
| CN | 101404152 A | | 4/2009 | |
| CN | 102043583 A | | 5/2011 | |
| CN | 102129312 A | | 7/2011 | |
| CN | 102365617 A | | 2/2012 | |
| JP | 11-272393 | | 10/1999 | |
| JP | 2009-87295 | | 4/2009 | |
| JP | 2010-182046 | | 8/2010 | |
| JP | 2011-86036 | | 4/2011 | |
| KR | 10-2009-0022037 | | 3/2009 | |
| KR | 10-1039605 | | 6/2011 | |
| KR | 20110081353 A | | 7/2011 | |
| KR | 10-2013-0019284 | * | 2/2013 | |
| WO | WO2006123513 A1 | | 1/2006 | |
| WO | WO 2010147611 A1 | * | 12/2010 | ......... G02B 13/0065 |
| WO | WO 2011/135944 A1 | | 11/2011 | |

OTHER PUBLICATIONS

International Search Report dated Mar. 29, 2013 in connection with International Application No. PCT/KR2012/009468, 4 pages.
Written Opinion of International Searching Authority dated Mar. 29, 2013 in connection with International Application No. PCT/KR2012/009468, 6 pages.
Decision of Rejection dated May 13, 2014 in connection with Japanese Application No. 2012-248780, 5 pages.
Notice of Preliminary Rejection dated Dec. 17, 2013 in connection with Japanese Application No. 2012-248780, 5 pages.
Office Action dated Feb. 12, 2015 in connection with Chinese Patent Application No. 201210449536.2; 27 pages.
Text of the Second Office Action dated Oct. 26, 2015 in connection with Chinese Patent Application No. 2012-104495362; 30 pages.
Text of the Third Office Action dated May 10, 2016 in connection with Chinese Patent Application No. 2012-104495362; 34 pages.
Extended European Search Report dated Jul. 21, 2016 in connection with European Application No. 12192116.7, 6 pages.
Untied States Patent & Trademark Office, "Non-Final Office Action," U.S. Appl. No. 15/231,530, Nov. 25, 2016, 22 pages, publisher USTPO, Alexandria, VA.
Foreign Communication From a Related Counterpart Application, Chinese Application No. 201210449536.2, Rejection Decision dated Mar. 3, 2017, 34 pages.

* cited by examiner

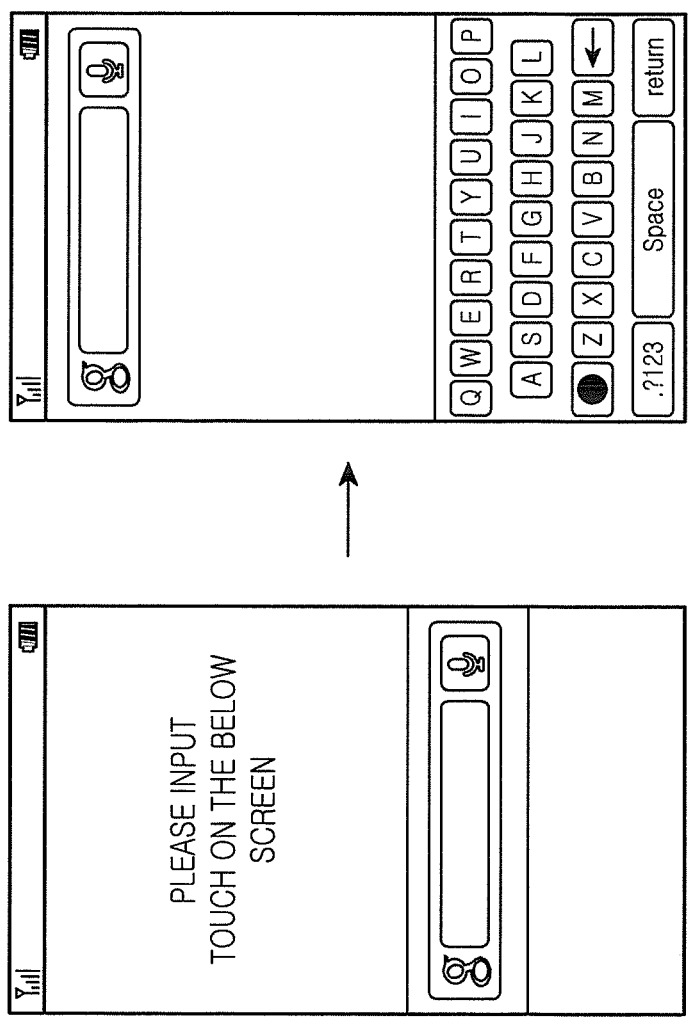

METHOD AND APPARATUS FOR DESIGNATING ENTIRE AREA USING PARTIAL AREA TOUCH IN A PORTABLE EQUIPMENT

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Nov. 11, 2011 and assigned Serial No. 10-2011-0117836, the entire disclosure of which is hereby incorporated by reference.

TECHNICAL FIELD OF THE INVENTION

The present disclosure relates to a method and apparatus for touch input in an electronic device, and specifically, to a method and apparatus for designating an entire display area in an electronic device having a large display screen.

BACKGROUND OF THE INVENTION

A smart phone or a tablet computer has a larger display area than a typical mobile communication terminal.

However, there may be a situation where a user cannot provide a touch input on a corresponding device with one hand while holding the device with the other hand.

In this situation, since the entire display area of the device may not be able to be touched with a hand which holds the device due to the larger display area, there is a problem in that the device cannot be conveniently used.

SUMMARY OF THE INVENTION

To address the above-discussed deficiencies of the prior art, it is a primary object to provide at least the advantages described below. Accordingly, an aspect of the present disclosure is to provide a method and apparatus for designating an entire area by using a partial area touch in a portable device.

Another aspect of the present disclosure is to provide a method and apparatus for designating an entire display area by a user by using a touch on any partial area included in the entire display area when it is difficult for the user to touch the entire display area with one hand in a portable device having a large display screen such as a smart phone or a tablet computer.

Another aspect of the present disclosure is to provide a method and apparatus for designating an entire display area by using one finger of one hand while a user holds a device with the other hand in a portable device having a large display screen such as a smart phone or a tablet computer.

Another aspect of the present disclosure is to provide a method and apparatus for enabling a touch on an entire display area of a portable device when a user uses the portable device with one hand while hanging on to a strap in a bus or subway or while carrying an object.

In accordance with an aspect of the present disclosure, a touch input method of a portable device is provided. The method includes determining whether an input for selecting a specific divided area is detected in a divided touch area on a screen divided into a plurality of areas. The method also includes, if the input for selecting the specific divided area is detected, moving the selected specific divided area to the divided touch area. The method further includes, if a specific input occurs in the selected specific divided area moved to the divided touch area, performing a function of an item indicated by the specific input.

In accordance with another aspect of the present disclosure, a portable device apparatus supporting a touch input is provided. The apparatus includes a controller configured to determine whether an input for selecting a specific divided area is detected in a divided touch area on a screen divided into a plurality of areas. The controller is also configured to, if the input for selecting the specific divided area is detected, move the selected specific divided area to the divided touch area. The controller is further configured to, if a specific input occurs in the selected specific divided area moved to the divided touch area, perform a function of an item indicated by the specific input. The apparatus also includes a touch input unit configured to provide a touch input to the controller, and a display unit configured to display a display output of the controller on a screen.

In accordance with still another aspect of the present disclosure, a touch input method of a portable device is provided. The method includes initiating a pattern recognition, determining whether an input for selecting a specific divided area is detected in a divided touch area on a screen divided into a plurality of areas and if the input for selecting the specific divided area is detected, moving the selected specific divided area to the divided touch area.

In accordance with yet another aspect of the present disclosure, a portable device apparatus supporting a touch input is provided, the apparatus includes a controller configured to initiates a pattern recognition and to determine whether an input for selecting a specific divided area is detected in a divided touch area on a screen divided into a plurality of areas and, if the input for selecting the specific divided area is detected, to move the selected specific divided area to the divided touch area.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 1A through 1E illustrate a display screen that is divided into two parts according to an embodiment of the present disclosure;

DETAILED DESCRIPTION OF THE INVENTION

Figure 1C:
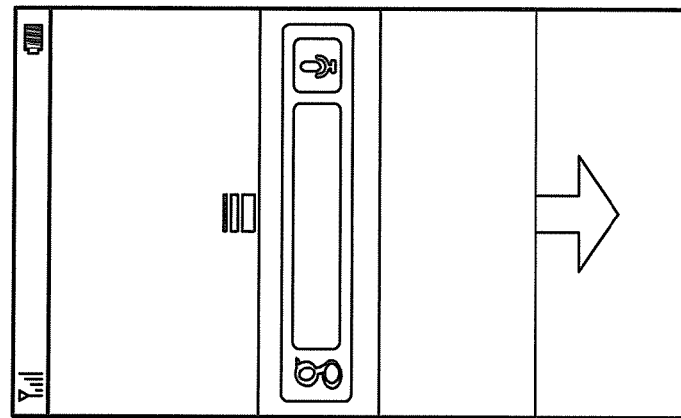

FIGS. 1A through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Exemplary embodiments of the present disclosure will be described herein below with reference to the accompanying drawings. In the following description, well-known functions or constructions are not described in detail since they would obscure the disclosure in unnecessary detail. Also, the terms used herein are defined according to the functions of the present disclosure. Thus, the terms may vary depending on user's or operator's intension and usage. That is, the terms used herein are to be understood based on the descriptions made herein.

Hereinafter, a method and apparatus for designating an entire area by using a partial area touch in a portable device will be described. In the present disclosure, the portable device includes a smart phone, a tablet computer, portable devices capable of receiving a touch input, and devices capable of receiving a touch input.

The present disclosure relates to a method and apparatus for designating an entire display area by using a touch on any partial area included in the entire display area when it is difficult for a user to touch the entire display area with one hand in a portable device having a large display screen such as a smart phone or a tablet computer.

The portable device of the present disclosure divides a display screen into several parts according to a specific length or distance reachable by a thumb of a user who holds the portable device.

The portable device of the present disclosure can start and perform a screen movement request function of the user by recognizing a specific pattern of a touch input of a thumb or a finger of the user.

In the present disclosure, the specific pattern is a predetermined pattern capable of recognizing that the portable device performs the display screen movement function. In the present disclosure, a display screen movement request type and a screen movement range may vary depending on horizontal and vertical sizes of a display of the portable device. That is, the present disclosure determines the number of the divided display screens according to horizontal and vertical sizes of the display of the portable device. Alternatively, the number of divided display screens can be determined to any number N according to a user or manufacturer.

That is, if the display is relatively small in size, the display may be divided into two parts and each half screen may move up and down or left and down. If the display is large in size, when the portable device displays a numeric number corresponding to a number assigned to a divided display area after the user requests to move the display screen, the user can designate the divided display screen by the use of a touch input and can request to move the screen.

When the user requests to move the divided display screen, a desired divided display screen moves in a range reachable by a user's finger and a popup for requesting the touch input is displayed in the display screen.

After the divided display screen moves, if there is another touch input of the user, a size of the display area returns to an original size while performing a function for indicating the touch input.

The aforementioned process is described below with reference to the accompanying drawings.

FIGS. 1A through 1E illustrate a display screen that is divided into two parts according to an embodiment of the present disclosure.

Figure 1B:
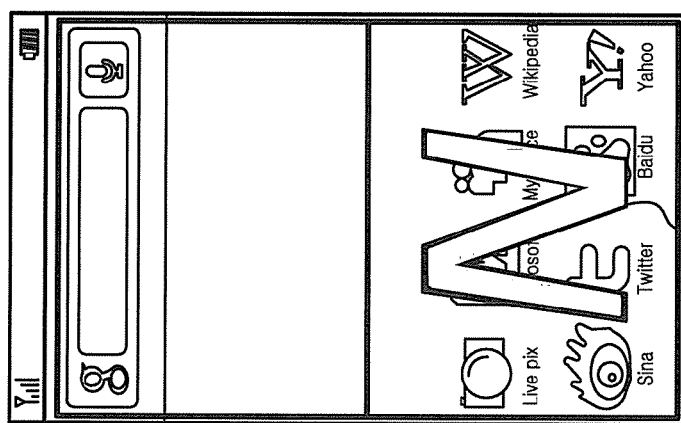
Figure 1A:
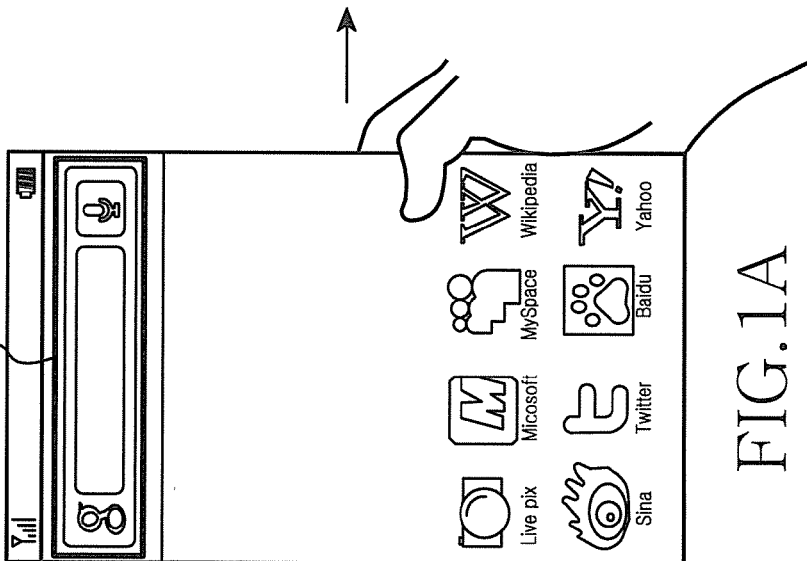

Referring to FIGS. 1A through 1E, if a user holds a portable device with one hand and an input window for a user input is located in an upper part of the display screen (FIG. 1A), the portable terminal receives a touch input on a predefined specific pattern to move the display screen from the user (FIG. 1B). Although "N" is used as the specific pattern in the present embodiment, it is apparent that the specific pattern may include other types of pattern.

If the portable device detects the specific pattern touch input, the portable device moves downwards an upper part of the display screen (FIG. 1C). When the upper part of the display screen moves downwards, the portable device can display an input request text to the upper part of the display screen (FIG. 1D). Alternatively, the portable device can display the number of text messages currently received or the number of e-mails currently received to the upper part of the display screen.

When the user provides the touch input to the input window of the upper part of the display screen, the portable device can display an input screen in response to the touch input, and can wait for a subsequent input (FIG. 1E).

FIGS. 2A through 2G illustrate a display screen that is divided into a number of equal parts according to an embodiment of the present disclosure.

Referring to FIGS. 2A through 2G, the number of equal parts may be nine parts for example.

Figures 2A, 2B:
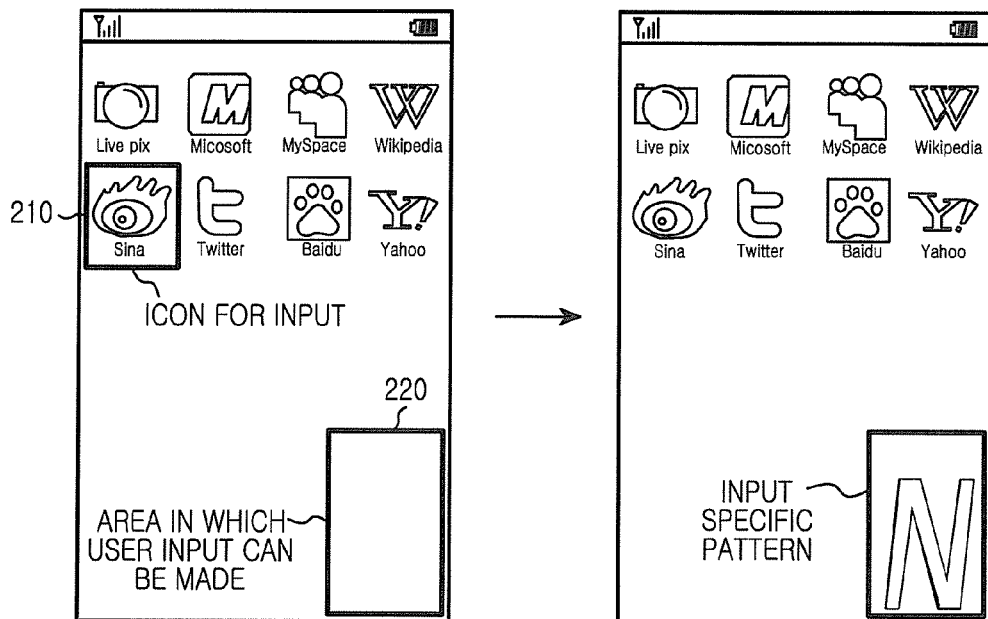
FIGS. 2A through 2G illustrate a display screen that is divided into a number of equal parts according to an embodiment of the present disclosure.

If a user holds a tablet computer with one hand, an icon 210 for a user input is located in an upper left portion of the display screen, and a display screen area 220 in which a user input can be made by using a user's finger is located in lower right part (FIG. 2A), then the tablet computer receives a touch input on a specific pattern predefined for a display screen movement in the display screen area 220 in which input can be made (FIG. 2B). Although "N" is used as the specific pattern in the present embodiment, it is apparent that the specific pattern may include other types of pattern and the specific pattern may inputted in the display screen area 220 in which input can be made and may inputted in any other display screen area.

Figures 2C, 2D:
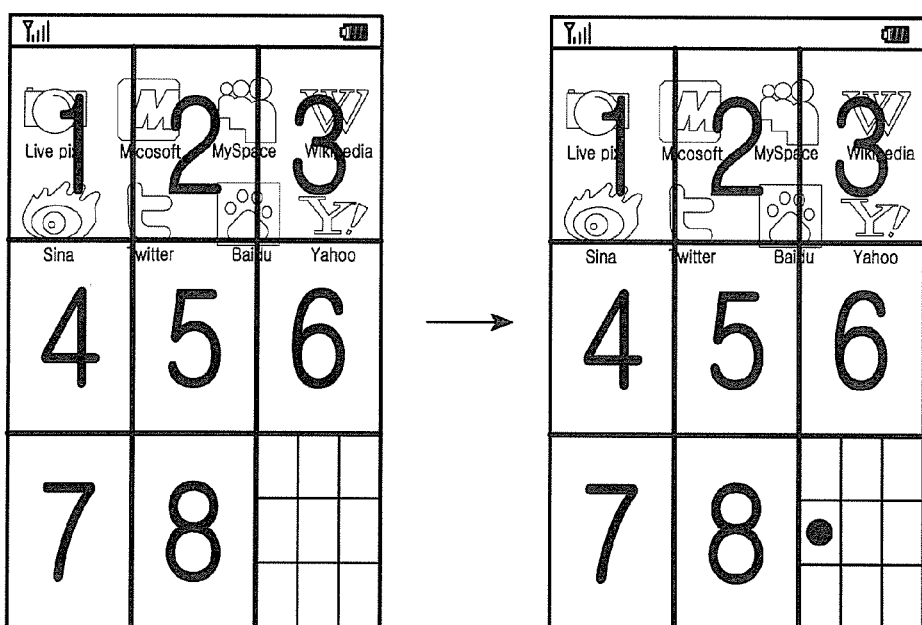

Thereafter, if the tablet computer detects the specific pattern touch input, the tablet computer displays a screen divided into (N+1) equal parts (FIG. 2C). Although N is set to 8 in the present embodiment, the value N can be predetermined by a vendor, a manufacturer, or a user. Alternatively, the user can determine the value N when booting the tablet computer. In this step, the tablet computer outputs a division number to each divided area. Further, a grid capable of identifying the divided area is displayed in the display screen area 220 in which the input can be made.

Thereafter, the tablet computer may receive the touch input for a grid corresponding to a location of a screen area having the icon 210 for the user input (FIG. 2D).

In addition, the tablet computer may receive directly input the division number corresponding to the location of the screen area having the icon 210 for the user input into the display screen area 220 in which input can be made.

In addition, the tablet computer may receive a tap number corresponding to a division number of the location of the screen area having the icon 210 for the user input in the display area 220 in which input can be made.

Figure 2G:
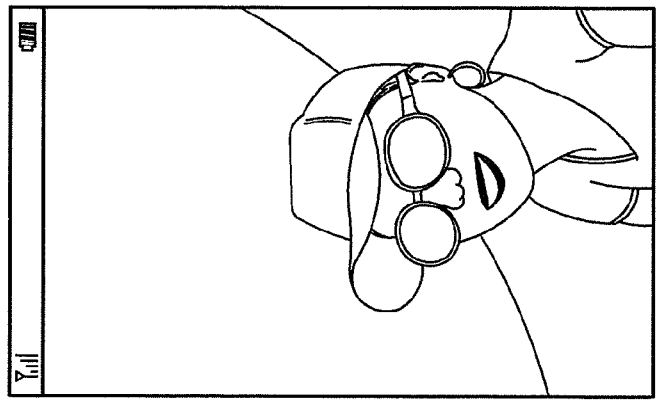
Figure 2F:
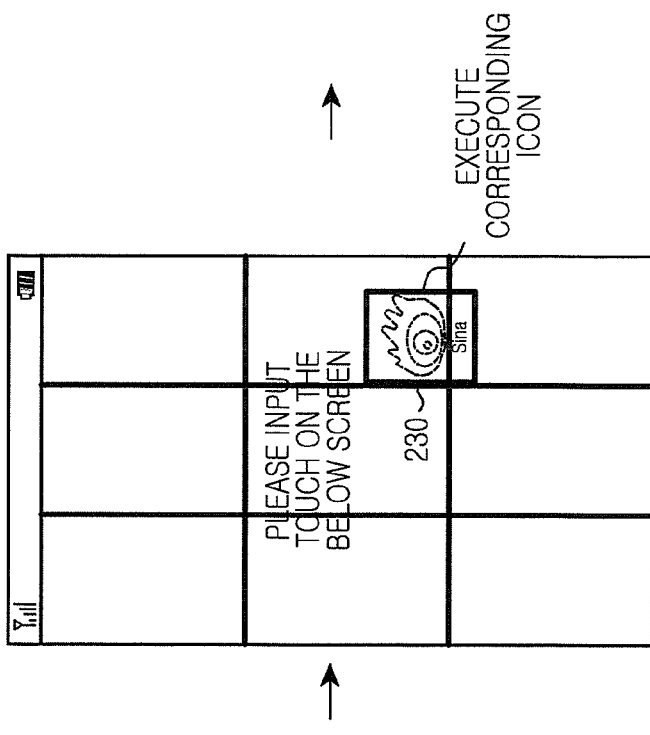
Figure 2E:
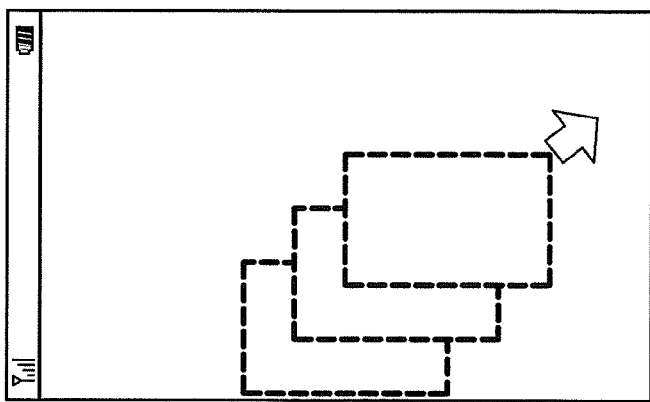

Thereafter, the tablet computer recognizes the division number of the location of the screen area having the icon 210 for the user input, and thereafter moves the area to the display screen area 220 in which the input can be made (FIG. 2E).

In addition, the tablet computer can recognize the division number of the location of the screen area having the icon 210 for the user input, and thereafter can move the icon of the area to the display screen area 220 in which the input can be made.

Thereafter, the tablet computer may receive the tab input for the icon included in the screen area having the icon 210 for the user input and moved to the display screen area 220 in which the input can be made (FIG. 2F).

In addition, the tablet computer may receive the tab input for the icon moved to the display screen area 220 in which the input can be made.

Thereafter, the tablet computer can execute a corresponding application program in a full screen in response to the tab touch input, and then can wait for a subsequent input (FIG. 2G).

Figure 3:
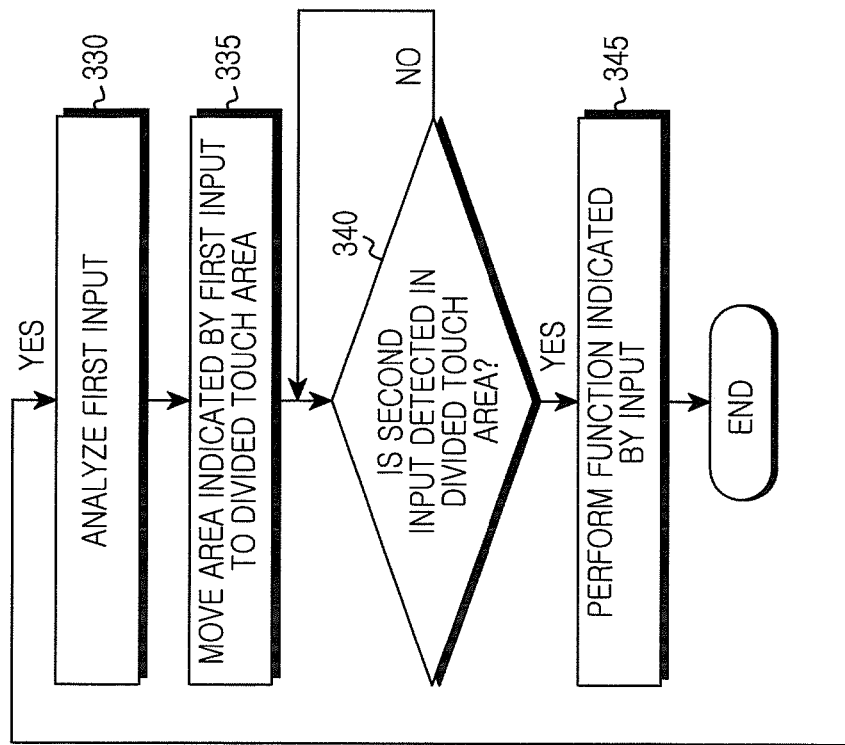
FIG. 3 is a flowchart illustrating a process of operating a portable device according to an embodiment of the present disclosure.
Figure 3:
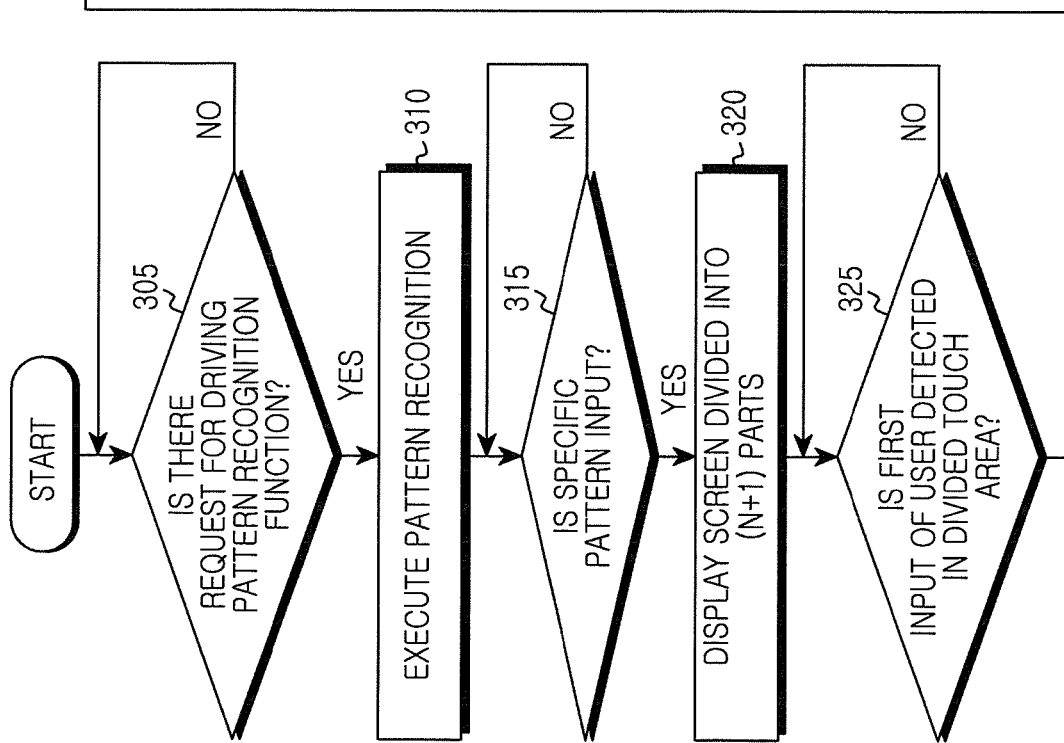

FIG. 3 is a flowchart illustrating a process of operating a portable device according to an embodiment of the present disclosure.

Referring to FIG. 3, if the portable device receives a request for executing a pattern recognition function from a user (block 305), the portable device starts the pattern recognition function (block 310). The pattern recognition function can be turned on/off by the user. Thereafter, if the user performs a touch input on a specific pattern in the display screen of the portable device, the portable device can recognize the specific pattern.

Thereafter, if the portable device detects the specific pattern touch input from the user (block 315), the portable device displays a screen divided into (N+1) equal parts together with a grid and a corresponding number (block 320). Herein, the grid capable of identifying each divided area can be displayed in a divided touch area. The divided touch area represents a display screen area in which input can be made. Also, the divided touch area represents a divided area in which the portable terminal receives an input for selecting the specific divided area and a location of the divided touch area and a size of the divided touch area are not limited.

Thereafter, the portable device determines whether a first input of the user is detected in the divided touch area (block 325). The first input represents an input for indicating a screen area having an icon or item for a user input by the user among the (N+1) divided areas. If the first input of the user is detected in the divided touch area, the portable device analyzes the first input (block 330).

The first input may be an input for a grid corresponding to a location of a screen area having the icon or item for the user input, an input for a number assigned to a location of the screen area having the icon or item for the user input, and a tab input of which a number corresponds to the number assigned to the location of the screen area having the icon or item for the user input.

After analyzing the first input, the portable device moves an area indicated by the first input to the divided touch area (block 335). In some embodiments, the portable device may move only an icon of the area to the divided touch area.

Thereafter, the portable device determines whether there is a second input for an icon on the divided area moved to the display screen area in which the user input can be made by using a finger, that is, the divided area moved to the divided touch area, or for an icon moved to the divided touch area (block 340).

Thereafter, the portable device executes an application program for the icon in response to the second input (block 345).

The method described above in relation with FIG. 3 under of the present invention may be provided as one or more instructions in one or more software modules stored in the respective apparatus.

Figure 4:
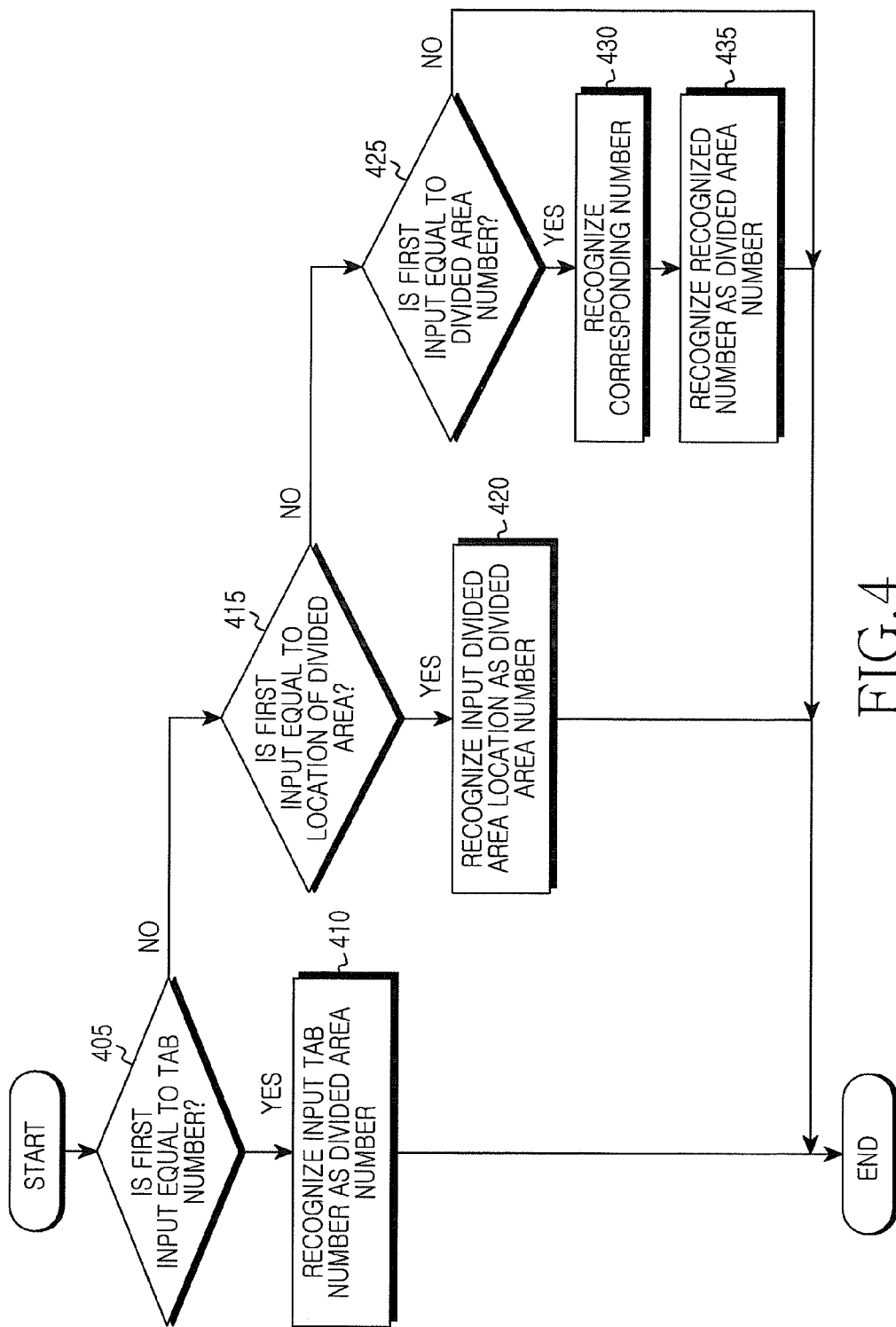
FIG. 4 is a flowchart illustrating a process of processing a first input in a portable device according to an embodiment of the present disclosure.

FIG. 4 is a flowchart illustrating a process of processing a first input in a portable device according to an embodiment of the present disclosure.

Referring to FIG. 4, if the first input is a tab input of which a number corresponds to a number assigned to a location of a screen area having an icon or item for a user input (block 405), the portable device recognizes the input tab number as a number for a divided area (block 410).

If the first input is an input for a grid corresponding to a location of the divided area, that is, the location of the screen area having the icon or item for the user input (block 415), the portable device recognizes the location of the input divided area as a number assigned to the divided area (block 420).

If the first input is an input for a number assigned to the screen area having, the icon or item for the user input (block 425), the portable device recognizes a number corresponding to the number input by the user by analyzing the touch input for the number (block 430), and recognizes the recognized number as a number assigned to the divided area (block 435).

The method described above in relation with FIG. 4 under of the present invention may be provided as one or more instructions in one or more software modules stored in the respective apparatus.

Figure 5:
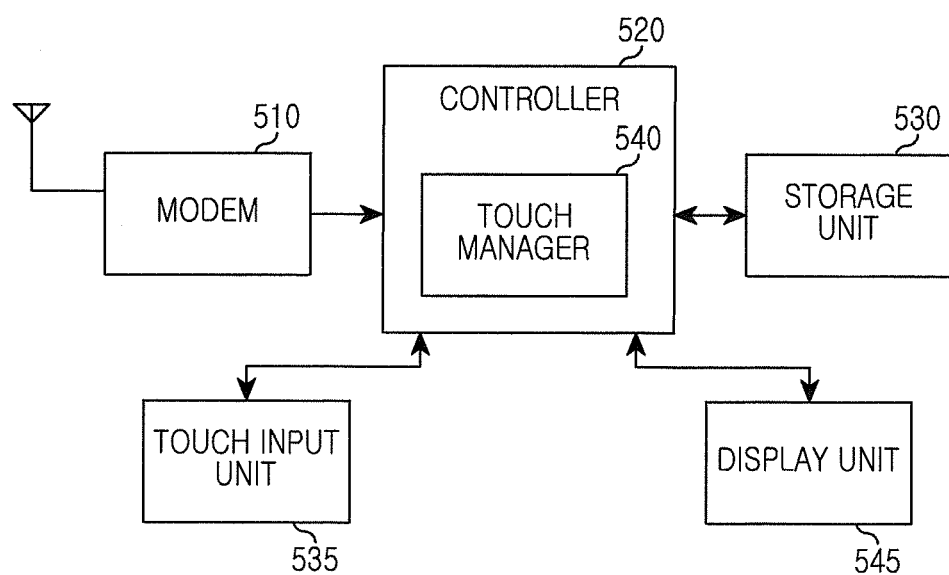
FIG. 5 is a block diagram of a portable device according, to an embodiment of the present disclosure.

FIG. 5 is a block diagram of a portable device according to an embodiment of the present disclosure.

Referring to FIG. 5, the portable device includes a modem 510, a controller 520, a storage unit 530, a touch input unit 535, a touch manager 540, and a display unit 545.

The modem 510 is a module for communicating with another device, and includes a radio processor, a baseband processor, and the like. The radio processor converts a signal received through an antenna into a baseband signal and provides the converted signal to the baseband processor. Further, the radio processor converts a baseband signal received from the baseband processor into a radio signal so that it can be transmitted on an actual radio path, and transmits the converted signal through the antenna.

All types of radio communication protocols currently used can be used as a radio communication protocol used in the modem 510.

The controller 520 provides an overall control of the portable device. In particular, according to the present disclosure, the controller 520 can control or include the touch manager 540. Further, the controller 520 controls the modem 510, the storage unit 530, the touch input unit 535, and the display unit 545. Because the controller 520 can include the touch manager 540, the controller can perform the operation of the touch manager 540.

The storage unit 530 performs a function for controlling an overall operation of the portable device and a function for storing temporary data generated while performing the program.

The touch input unit 535 receives a touch input from the user, and provides data for the input to the controller 520 or the touch manner 540.

The display unit 545 displays output data of the controller 520 and the touch manager 540.

The touch manager 540 performs a pattern recognition function. The pattern recognition function may be turned on/off by the user. Thereafter, if the user performs a touch input on a specific pattern in the display screen of the portable device, the portable device can recognize the specific pattern.

Thereafter, upon detection of the specific pattern input from the user, the touch manager 540 displays a screen divided into (N+1) parts. In this situation, a grid capable of identifying the divided area can be displayed together with the grid and a division number in the divided touch area.

Thereafter, the touch manager 540 determines whether a first input is detected in the divided touch area. The first input represents an input for indicating a screen area having an icon or item for a user input among the (N+1) divided areas. If the first input is detected in the divided touch area, the portable device analyzes the first input. The division number may not be displayed in the divided touch area.

The first input may be an input for a grid corresponding to a location of a screen area having the icon or item for the user input, an input for a number assigned to a location of the screen area having the icon or item for the user input, and a tab input of which a number corresponds to the number assigned to the location of the screen area having the icon or item for the user input.

After analyzing the first input, the touch manager 540 moves an area indicated by the first input to the divided touch area. In some embodiments, the touch manager 540 can move only an icon of the area to the divided touch area.

Thereafter, the touch manager 540 determines whether there is a second input for an icon on the divided area moved to the display screen area in which the user input can be made by using the finger, that is, the divided area moved to the divided touch area, or for an icon moved to the divided touch area.

Thereafter, the touch manager 540 executes an application program for the icon in response to the second input.

If the first input is a tab input of which a number corresponds to a number assigned to a location of a screen area having an icon or item for a user input, the touch manager 540 recognizes the input tab number as a number for a divided area.

If the first input is an input for a grid corresponding to a location of the divided area, that is, the location of the screen area having the icon or item for the user input, the touch manager 540 recognizes the location of the input divided area as a number assigned to the divided area.

If the first input is an input for a number assigned to the screen area having the icon or item for the user input, the touch manager 540 recognizes a number corresponding to the number input by the user by analyzing the touch input for the number, and recognizes the recognized number as a number assigned to the divided area.

The portable device may be an electronic device such as, for example, a laptop, a smart phone, a net book, a mobile internet device, an ultra mobile PC, a tablet personal computer, a mobile telecommunication terminal, PDA having a camera and the like herein, just to name some of the possibilities.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

The present disclosure has an advantage in that a user can designate an entire display area by using a touch on any partial area included in the entire display area when it is difficult for the user to touch the entire display area with one hand in a portable device having a large display screen such as a smart phone or a tablet computer.

The present disclosure also has an advantage in that the user can touch an entire display area of the portable device when the user uses the portable device with one hand while hanging on to a strap in a bus or subway or while carrying an object.

The present disclosure also has an advantage in that a physically challenged person who can use only one hand can conveniently use the portable device.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A touch input method of a portable device, the method comprising:
   determining, by the portable device, whether a first input for selecting a divided area other than a divided touch area among a plurality of divided areas is detected in the divided touch area on a screen, the screen being divided into the plurality of divided areas, one divided area among the plurality of divided areas being set as the divided touch area;
if the first input for selecting the divided area is detected, moving an icon included in the selected divided area to the divided touch area, wherein the icon is not displayed in the selected divided area after moving the icon; and
if a second input occurs on the icon that is moved to the divided touch area, executing an application corresponding to the icon.

2. The method of claim 1, further comprising, before determining whether the first input is detected, initiating a pattern recognition; and
determining whether there is a specific pattern input for selecting the divided area.

3. The method of claim 2, further comprising:
if there is the specific pattern input for selecting the divided area, displaying the screen divided into the plurality of divided areas together with a division number.

4. The method of claim 2, further comprising:
if there is the specific pattern input for selecting the divided area, displaying a grid pattern in the divided touch area.

5. The method of claim 1, wherein determining whether the first input is detected comprises determining whether a tap input corresponding to a number assigned to the selected divided area occurs in the divided touch area.

6. The method of claim 1, wherein determining whether the first input is detected comprises determining whether an input occurs in a grid of the divided touch area corresponding to a location of the selected divided area.

7. The method of claim 1, wherein determining whether the first input is detected comprises determining whether an input of a number corresponding to a division number of the selected divided area occurs in the divided touch area.

8. The method of claim 1, wherein moving the icon to the divided touch area further comprises moving the image displayed in the selected divided area to the divided touch area.

9. The method of claim 1, wherein the divided touch area is a divided area in which the portable device receives an input for selecting the divided area.

10. A portable device apparatus supporting a touch input, the apparatus comprising:
a controller configured to:
determine whether a first input for selecting a divided area other than a divided touch area among a plurality of divided areas is detected in the divided touch area on a screen, the screen being divided into a plurality of divided areas, one divided area among the plurality of divided areas being set as the divided touch area;
if the first input for selecting the divided area is detected, move an icon included in the selected divided area to the divided touch area, wherein the icon is not displayed in the selected divided area after moving the icon; and
if a second input occurs on the icon that is moved to the divided touch area, execute an application corresponding to the icon;
a touch input unit configured to provide a touch input to the controller; and
a display unit configured to display a display output of the controller on the screen.

11. The apparatus of claim 10, wherein before the determination of whether the first input is detected, the controller initiates a pattern recognition and determines whether there is a specific pattern input.

12. The apparatus of claim 11, wherein, if there is the specific pattern input for selecting the divided area, the controller displays the screen divided into the plurality of divided areas together with a division number.

13. The apparatus of claim 11, wherein, if there is the specific pattern input for selecting the divided area, the controller displays a grid pattern in the divided touch area.

14. The apparatus of claim 10, wherein in the determination of whether the first input is detected, the controller determines whether a tap input corresponding to a number assigned to the selected divided area occurs in the divided touch area.

15. The apparatus of claim 10, wherein in the determination of whether the first input is detected, the controller determines whether an input occurs in a grid of the divided touch area corresponding to a location of the selected divided area.

16. The apparatus of claim 10, wherein in the determination of whether the first input is detected, the controller determines whether an input of a number corresponding to a division number of the selected divided area occurs in the divided touch area.

17. The apparatus of claim 10, wherein to move the icon to the divided touch area, the controller moves an icon of the selected divided area to the divided touch area.

18. The apparatus of claim 10, wherein the divided touch area is a divided area in which the portable device receives an input for selecting the divided area.

19. A touch input method of a portable device, the method comprising:
initiating a pattern recognition;
determining whether a first input for selecting a divided area other than a divided touch area among a plurality of divided areas is detected in a divided touch area on a screen, the screen being divided into the plurality of divided areas, one divided area among the plurality of divided areas being set as the divided touch area;
if the first input for selecting the divided area is detected, moving an icon included in the selected divided area to the divided touch area, wherein the icon is not displayed in the selected divided area after moving the icon; and
if a second input occurs on the icon that is moved to the divided touch area, executing an application corresponding to the icon.

20. A portable device apparatus supporting a touch input, the apparatus comprising:
a controller configured to:
initiate a pattern recognition;
determine whether a first input for selecting a specific divided area other than a divided touch area among a plurality of divided areas is detected in the divided touch area on a screen, the screen being divided into a plurality of divided areas, one divided area among the plurality of divided areas being set as the divided touch area;
if the first input for selecting the divided area is detected, move an icon included in the selected divided area to the divided touch area, wherein the icon is not displayed in the selected divided area after moving the icon; and if a second input occurs on the icon that is moved to the divided touch area, execute an application corresponding to the icon;
a touch input unit configured to provide a touch input to the controller; and
a display unit configured to display a display output of the controller on a screen.

* * * * *